(12) United States Patent
Maor et al.

(10) Patent No.: US 6,380,540 B1
(45) Date of Patent: Apr. 30, 2002

(54) RADIATION IMAGING USING SIMULTANEOUS EMISSION AND TRANSMISSION

(75) Inventors: Dov Maor; Alex Silberklang; Aharon Peretz; Alex Natanzon, all of Haifa (IL)

(73) Assignee: GE Medical Systems Israel, Ltd., Tirat-Hacarmel (IL)

( * ) Notice: Subject to any disclaimer, the term of this patent is extended or adjusted under 35 U.S.C. 154(b) by 0 days.

(21) Appl. No.: 09/355,720
(22) PCT Filed: Jan. 29, 1997
(86) PCT No.: PCT/IL97/00037
§ 371 Date: Oct. 21, 1999
§ 102(e) Date: Oct. 21, 1999
(87) PCT Pub. No.: WO98/33076
PCT Pub. Date: Jul. 30, 1998

(51) Int. Cl.[7] .............................................. G01T 1/161
(52) U.S. Cl. .............................. 250/363.04; 250/363.02
(58) Field of Search ........................ 250/363.02, 363.04

(56) References Cited

U.S. PATENT DOCUMENTS

| | | | | |
|---|---|---|---|---|
| 5,015,860 A | * | 5/1991 | Moses .................... | 350/363.02 |
| 5,155,365 A | * | 10/1992 | Cann et al. ............ | 250/363.02 |
| 5,376,795 A | * | 12/1994 | Hasegawa et al. ..... | 250/363.04 |
| 5,903,008 A | * | 5/1999 | Li ......................... | 250/363.02 |

FOREIGN PATENT DOCUMENTS

| | | |
|---|---|---|
| EP | 0 747 728 A | 12/1996 |
| FR | 2 151 001 A | 4/1973 |
| WO | WO 98/33067 | 7/1998 |

OTHER PUBLICATIONS

Patent Abstracts of Japan vol. 096, No. 009, Sep. 30, 1996 & Toshiba Corp. JP 08 122438 A, May 17, 1996.
Patent Abstracts of Japan vol. 010, No. 180 (P–471), Jun. 24, 1986 & Koichi Ogawa; others:2 JP 61 026879 A, Feb. 6, 1986.
D.R. Gilland et al.: "Quantitativespect Imaging With Indium–111" Oct. 22, 1990, Nuclear Science Symposium Conferencerecord, Arlington, Oct. 22–27, 1190, vol. 2 of 2, pp. 1194–1199, G.C. Smith XP000232202 see p. 1195, col. 1, line 8–col. 2, line 21; figure 2.
P Tan et al.: "A Scanningline Source For Simutaneousemission and Transmission Measurementsin Spect" Journal of Nuclear Medicine, vol. 34, No. 10, Oct. 1993, pp. 1752–1760, XP000601777.
Tung C–H et al; Non–Uniform Attenuation Correction Using Simultaneous Transmission & Emission Converging Tomography; 1992; IEEE Transactions on Nuclear Science vol. 3, No. 4; P1134–1143.

* cited by examiner

Primary Examiner—Constantine Hannaher
Assistant Examiner—Andrew Israel
(74) Attorney, Agent, or Firm—Fenster & Company Patent Attorneys, Ltd.

(57) ABSTRACT

A gamma camera (70), comprising: at least one emission detector (72), which receives radiation emitted from the body of a subject (26) and generates signals responsive thereto; a radiation source (74), which directs radiation toward the body; at least one transmission detector (76), having a long dimension, which receives radiation transmitted through the body (26) from the radiation source (74) and generates signals responsive thereto, wherein the transmission detector (76) translates in a direction generally perpendicular to the long dimension.

38 Claims, 5 Drawing Sheets

RADIATION IMAGING USING SIMULTANEOUS EMISSION AND TRANSMISSION

RELATED APPLICATION

The present application is a U.S. national stage application of PCT/IL97/00037, filed Jan. 29, 1997.

FIELD OF THE INVENTION

The present invention relates generally to systems and methods of emission tomography, and specifically to gamma cameras for simultaneously producing tomographic maps based on emission and transmission of radiation.

BACKGROUND OF THE INVENTION

Gamma cameras known in the art produce tomographic images that are indicative of physiological activity. Such cameras receive radiation that is emitted by radioisotope markers or tracers, which are introduced into the body of a subject and are taken up by an organ of the body in proportion to the physiological activity of interest. The radiation emitted is generally received by scintillator/detector systems, which produce signals responsive to photons of the radiation incident thereon. The signals are processed and back-projected, using computerized tomography methods known in the art, to produce a three-dimensional image indicative of localized activity within the organ.

In the context of the present patent application, the terms "tomographic" and "tomographic images" will be taken to include any three-dimensional images produced using a gamma camera, whether based on emission signals or on transmission signals, as will be described below. Gamma cameras known in the art for producing such three-dimensional tomographic images include Single Photon Emission Computerized Tomography (SPECT) and Positron Emission Tomography (PET) systems.

In some SPECT systems, known in the art, a transmission image of the body, preferably a tomographic image, including the region of the organ of interest, is produced concurrently with the emission image. This transmission image is useful in relating the emission image to the actual position and dimensions of the organ. It also provides information regarding attenuation of the radiation as it passes through the body along different paths, which is used to correct the emission signals for variations in attenuation thereof.

FIGS. 1–3 schematically illustrate, in axial, sectional views, systems known in the art for simultaneous emission and transmission imaging.

FIG. 1 shows a SPECT camera 20 for emission and transmission tomography as known in the art. Due to the limited view of the source a 360° rotation is generally necessary for producing an emission tomographic image. Camera 20 includes a planar emission detector 22 and a planar transmission detector 24, positioned on opposite sides of a body 26 of a subject. A radiation line source 28, having its long axis perpendicular to the plane of the figure, emits a fan beam 30 of radiation, which is collimated so as to be limited to rays substantially parallel to the plane of the figure. These rays are received by transmission detector 24 after passing through body 26 and, preferably, through a collimator 23, adjacent to detector 24. Collimator 23 is intended to block a considerable fraction of photons emitted and scattered from body 26 from reaching detector 24.

Detectors 22 and 24 and source 28 are mounted to revolve about body 26, as indicated by arrows 32. As the detectors revolve, they generate signals responsive to radiation photons incident thereon. A computer 34 receives these signals over 180° or, preferably, 360° of revolution of the detectors and source, and then processes and back-projects them to produce emission and transmission tomographic images.

Although detector 24 is referred to here as a transmission detector, some emission from body 26 also reaches this detector, to the extent that this emission is not blocked by collimator 23. Therefore, line source 28 is generally made to emit photons of substantially different energy from those characteristic of the radioisotope marker injected into body 26, and the emission- and transmission-responsive signals from detector 24 are separated by energy measurement, as is known in the art. It will be appreciated, however, that some cross-talk between the emission and transmission signals is generally unavoidable. Because camera 20 has only a single emission detector 22, the scan time needed to form the emission image is also relatively long, and the camera cannot be used in PET imaging. Moreover, the geometry of the transmission rays is cumbersome and computationally inconvenient.

FIG. 2 schematically illustrates another SPECT camera 40, known in the art, for example, as described in "NON-UNIFORM ATTENUATION CORRECTION USING SIMULTANEOUS TRANSMISSION AND EMISSION TOMOGRAPHY" by C-H Tung IEEE TRANS. Nuc. Sci. V. 3, No. 4, P1134–1143, which is also incorporated herein by reference. Camera 40 includes two planar emission detectors 42 and one planar transmission detector 44 in a triangular arrangement, with line source 28 at the apex of the triangle opposite detector 44. A collimator 46 may be placed adjacent to detector 44, so that the rays reaching the detector are substantially limited to those from the direction of source 28 that pass within one of a plurality of axial slices through body 26, the slices being generally parallel to the plane of the figure. The elements of camera 40 shown in FIG. 2 revolve around body 26, and the detector signals are received and processed by computer, as described above with reference to FIG. 1 (although for the sake of simplicity, the computer is not shown here or in certain others of the figures). Camera 40 will generally be capable of reconstructing SPECT emission and transmission images with greater speed than camera 20, for example, but at the expense of an additional planar detector. Camera 40 is not suitable for PET imaging.

FIG. 3A schematically illustrates still another existing SPECT camera 50, based generally on the camera described in "A SCANNING LINE SOURCE FOR SIMULTANEOUS EMISSION AND TRANSMISSION MEASUREMENTS IN SPECT" by P. Tan, et al. J. Nuc. Med. 1993; 34:1752–1760, which is also incorporated herein by reference. Camera 50 includes two planar detectors 52 arranged at right angles, wherein both detectors serve as both emission and transmission detectors. Two line sources 28 are mounted respectively opposite the two detectors 52 so that each of the line sources is translatable in a direction parallel to the face of the respective detector, as indicated by arrows 54 in the figure. A collimator 29 is associated with each of sources 28, in order to limit the radiation impinging on body 26 from the respective source to rays that are within an axial slice through the body and are generally perpendicular to the respective detector 52 opposite the source. At each angular position, as the elements of camera 50 revolve as shown by arrow 32, sources 28 are swept laterally across body 26 along arrows 54, and the transmission signals from detectors 28 are used to reconstruct tomographic images. Because of the right-angle geometry of camera 50, only a 90° revolution of the elements shown of the camera is needed to reconstruct emission and transmission images.

In camera 50, detectors 52 serve as both emission and transmission detectors, and the transmission- and emission-responsive signals produced by the detectors must be distinguished from one another in order to produce the tomographic images. The signals may be separated by energy, as described above in reference to camera 20, shown in FIG. 1. Alternatively or additionally, an area of each of detectors 52 opposite moving source 28 may be temporarily "blanked" with respect to emission signals. Camera 50 is not suitable for PET imaging.

FIG. 3B shows another version of this camera, marketed by Picker under the name PRISM 2000 XP STEP OPTION, in which two parallel planar detectors 72a and 72b are used. Two collimators are associated with detectors 72a and 72b. A line source 96 collimated by a collimator 96 is situated in front of one of the collimators and scans across the collimator as shown by arrow 120.

SUMMARY OF THE INVENTION

It is an object of the present invention to provide gamma cameras that produce tomographic emission and transmission images simultaneously.

It is a her object of the present invention to reduce the time needed to scan a subject using such cameras.

It is still another object of the present invention to eliminate or at least substantially reduce crosstalk between emission and transmission signals in the cameras.

It is an additional object of the present invention to provide gamma cameras that produce tomographic emission and transmission images having improved image quality.

It is yet a further object of some aspects of the present invention to provide cameras that produce PET and transmission tomographic images simultaneously, wherein the cameras have dual, parallel emission detectors on opposing sides of the subject.

In some preferred embodiments of the present invention, a gamma camera comprises at least one linear transmission detector, oriented in a direction generally perpendicular to the long axis of the body of a subject, and two planar emission detectors. A radioisotope marker is introduced into the body, and radiation photons emitted by the marker in the body are received by the emission detectors, which generate signals responsive to the radiation. A radiation source is positioned opposite the at least one transmission detector, such that radiation from the source impinges on the detector after being transmitted through the body within a generally axial planar slice therethrough. Preferably, the radiation source emits photons of substantially different energy from those emitted by the radioisotope marker. The source and the transmission and emission detectors revolve about the axis of the body.

Preferably, the radiation source is axially collimated, so that radiation emitted therefrom is substantially limited to rays contained within an axial slice. Additionally, the source may be transversely collimated, so as to limit the emitted radiation within such a slice to an angular extent that is generally congruent with the transmission detector area and reduce the amount of spurious radiation reaching the emission detectors. Both axial and transverse collimation of the source are useful in reducing unnecessary radiation dosage to the subject.

Further preferably, a detector collimator, adjacent to the transmission detector, collimates the radiation impinging on the transmission detector, preferably in both the axial and transverse dimensions, so that the detector is allowed to receive radiation substantially only from the direction of the collimated radiation source. This detector collimation reduces the amount of stray radiation reaching the transmission detector due, for example to emission from the subject's body and scattering of the source radiation.

At each of a plurality of angular positions in the course of the revolution, the radiation source and transmission detectors are translated axially, together, over at least a portion of the length of the body. Thus, the transmission detectors generate signals responsive to the transmitted radiation through multiple axial slices extending axially over substantially all of the portion of the body. These transmission signals are received and processed by a computer, together with emission signals generated by the emission detectors, to reconstruct simultaneously-acquired, mutually-registered transmission and emission tomographic images.

Preferably, the linear transmission detectors comprise solid-state detector arrays, which generally have better energy resolution and are more accurate than scintillator-type detectors, which are commonly used to make up the planar emission and transmission detectors in gamma cameras known in the art. The relatively small area of the linear transmission detectors makes it economically feasible to use solid-state detectors for this purpose, whereas an entire planar array of solid-state detectors for detecting the transmitted radiation would be prohibitively expensive.

Alternatively, the at least one linear transmission detector and linear radiation source are oriented on either side of the subject parallel to the axis of the subject's body. The source and detector are transported from one of the emission detectors to the other and transmission data is acquired for each view.

The use of the linear transmission detectors, independent of the planar emission detectors, overcomes several of the shortcomings of the prior art: (1) Crosstalk between the emission and transmission signals is reduced. (2) Scanning time is reduced, since acquisition of emission and transmission signals is carried out simultaneously. (3) The quality of the transmission tomographic image, particularly the resolution of the image, is improved. (4) Such cameras may be used for either SPECT or PET imaging, with appropriate emission detectors and computer hardware and software, as will be described below.

In some preferred embodiments of this type, particularly useful in SPECT imaging, the two planar emission detectors are mounted in a mutually substantially perpendicular arrangement, defining a right angle in which the body of the subject is contained. The radiation source preferably comprises a point source, mounted so as to be translatable axially at or adjacent to the apex of the right angle. Two linear transmission detectors are likewise mutually substantially perpendicular and are translatably mounted opposite the point source, in substantially the same axial plane as the point source, so that the two emission detectors and the two transmission detectors together describe a generally square cross-sectional profile in the axial plane. The source and transmission detectors are axially collimated as described above. The transmission detectors are also transversely collimated to selectively receive radiation from the source.

As described above, the radiation source and the four detectors revolve about the axis of the body. At each of a plurality of radial angular orientations, the source and transmission detectors make an axial scan along the body, while the emission detectors simultaneously receive radiation emitted from the body. The detector geometry in these preferred embodiments is such that after 90° of revolution, a complete set of emission data is acquired, sufficient for reconstructing a tomographic emission image of the body. Reconstruction of a standard tomographic transmission image requires at least 180° of revolution, however. Alternatively, partial-view reconstruction algorithms such as are known in the art may be used to reconstruct the transmission using data acquired only over 90°.

In other preferred embodiments of this type, useful in PET, as well as SPECT imaging, the two planar emission detectors are mounted face-to-face, mutually substantially parallel, on opposite sides of the subject's body. A radiation line source is translatably mounted perpendicular to (or parallel to) the emission detectors at one side of the body, and a linear transmission detector is similarly translatably mounted on the other side of the body, substantially parallel to the line source and in a common axial plane therewith. The source and transmission detector are suitably collimated, as described above. The line source and the emission and transmission detectors revolve about the long axis of the body, and the source and transmission detector scan axially (or transversely) over the body at each of a plurality of angular orientations, as described above. In this geometry, 180° of revolution are generally needed to acquire sufficient data to reconstruct both the tomographic emission and transmission images. It will be appreciated that these preferred embodiments are suitable for use in PET imaging.

In still other preferred embodiments of this type, similarly useful in both PET and SPECT imaging, the two planar emission detectors are mounted face-to-face, with a linear transmission detector translatably mounted perpendicular thereto, as described above. A radiation point source, suitably collimated, is mounted opposite the transmission detector so as to translate axially in a common axial plane with the detector. Preferably, the radiation point source also translates within the axial plane in a transverse direction, generally parallel to the long dimension of the linear transmission detector. At each of a plurality of angular orientations as the source and detectors revolve around the body, the source and transmission detector scan over the body, as described above, to acquire tomographic transmission data.

Although the above preferred embodiments are described herein with reference to two emission detectors and one or two transmission detectors, it will be appreciated that the principles of the present invention may similarly be applied to produce gamma cameras having greater or lesser numbers of detectors and different detector geometries. For example, such a camera may be produced having a single emission detector and a single, linear transmission detector, preferably mutually positioned at generally right angles. This camera would achieve at least the object of producing tomographic images of improved quality, although it would not be suited for PET imaging.

Similarly, although it is generally preferable that the detectors be mutually positioned at right angles, the principles of the present invention may be applied to cameras having other detector arrangements, for example, a triangular arrangement of two emission detectors and one linear transmission detector.

There is thus provided, in accordance with a preferred embodiment of the invention al.

A gamma camera, comprising:
at least one emission detector, which receives radiation emitted from the body of a subject and generates signals responsive thereto;

a radiation source, which directs radiation toward the body;
at least one transmission detector, having a long dimension, which receives radiation transmitted through the body from the radiation source and generates signals responsive thereto,
wherein the transmission detector translates in a direction generally perpendicular to the long dimension.

Preferably, the at least one emission detector, the radiation source and the at least one transmission detector jointly revolve about an axis generally parallel to the body.

Preferably, the radiation source is collimated so as to substantially preclude direct incidence of radiation from the source on the at least one emission detector.

Preferably, the radiation source is collimated so as to substantially limit irradiation of the body to rays that would be incident on the transmission detector in the absence of the body.

In a preferred embodiment of the invention the transmission detector comprises an array of detectors, preferably a linear array or a plurality of linear arrays. Preferably, the detectors are solid state detectors.

In a preferred embodiment of the invention the source and transmission detector are mounted in a common plane. Preferably, the radiation source is collimated so that radiation therefrom is directly incident on the body substantially only in a vicinity of the common plane.

In a preferred embodiment of the invention the source and transmission detector jointly translate in a direction perpendicular to the common plane.

Preferably, the radiation source and transmission detector are mounted in an common axial plane and translate in a direction parallel to an axis of the body.

In a preferred embodiment of the invention the common plane is generally perpendicular to a plane defined by the at least one emission detector.

In another preferred embodiment of the invention the common plane is generally parallel to a plane defined by the at least one emission detector. Preferably, the radiation source and transmission detector are mounted in a common transverse plane and translate in a direction perpendicular to an axis of the body.

In a preferred embodiment of the invention the radiation source comprises a point source.

Preferably the at least one emission detector comprises two mutually-angled planar detectors, both detectors being substantially parallel to the axis of the body and defining an angle in which the body is contained, and wherein the point source is mounted to translate parallel to the axis in a vicinity of the apex of the angle. Preferably, the two planar detectors are mutually substantially perpendicular. Preferably, the at least one transmission detector comprises two mutually substantially perpendicular detectors, each of which is also perpendicular to one of the two planar detectors to which it is adjacent.

In a preferred embodiment of the invention the at least on transmission detector comprises an array of detectors placed along an arc having the source as its center.

In a preferred embodiment of the invention the at least one transmission detector comprises two mutually-angled detectors.

Preferably, the at least one planar emission detector comprises two substantially parallel planar detectors, positioned on opposing sides of the body.

In a preferred embodiment of the invention, the source is a line source.

In a preferred embodiment of the invention, the source is a line source and wherein the transmission detector moves along the circumference of a circle having the source as its center.

Preferably, the camera produces PET images. Preferably, the camera produces SPECT images.

Preferably the camera comprises a computer which receives the emission- and transmission responsive signals and reconstructs emission and transmission tomographic images of the body responsive to the signals.

There is further provided, in accordance with a preferred embodiment of the invention, method for forming simultaneous emission and transmission tomographic images, comprising:

(a) introducing a radioisotope tracer into the body of a subject;

(b) receiving radiation emitted by the tracer over at least one plane adjacent to the body at a first radial angular orientation, and generating signals responsive to the emitted radiation;

(c) irradiating the body with a radiation source, such that the irradiation is substantially confined to a generally planar slice or slices through the body;

(d) receiving radiation transmitted through the body from the radiation source, over an elongate detection area within the slice, and generating signals responsive to the transmitted radiation.

(e) translating the position of the slice along a direction generally perpendicular to the slice, while performing the above steps of irradiating and receiving radiation at each of a plurality of positions of the slice along the direction of translation;

(f) repeating (a)–(e) at each of a plurality of radial angular orientations subsequent to the first orientation;

(g) receiving and processing the emission-responsive and transmission-responsive signals to reconstruct the tomographic images.

Preferably, irradiating the body comprises irradiating the body with the collimated radiation source, such that the irradiation is substantially confined to a slice through the body, comprises irradiating the body such that the irradiation is substantially confined to an axial slice through the body.

Preferably, irradiating the body with the collimated radiation source, such that the irradiation is substantially confined to a slice through the body, comprises irradiating the body such that the irradiation is substantially confined to a longitudinal slice through the body.

In a preferred embodiment of the invention, receiving emitted radiation over the at least one longitudinal plane comprises receiving radiation over two longitudinal planes that are substantially mutually perpendicular.

Preferably, repeating (a)–(e) at each of the plurality of radial angular orientations comprises repeating the steps at a plurality of angular orientations spaced over substantially 90° of revolution about the axis.

Preferably, irradiating the body comprises directing a fan beam of radiation at the body from a point source.

In a preferred embodiment of the invention receiving emitted radiation over the at least one longitudinal plane comprises receiving radiation over two longitudinal planes that are substantially mutually parallel, on opposing sides of the body. Preferably, irradiating the body comprises directing a beam of substantially parallel rays of radiation at the body from a line source. Alternatively, irradiating the body comprises directing a beam of radiation at the body from a point source.

Preferably, receiving radiation transmitted through the body comprises receiving radiation within a region of one of the two substantially mutually parallel longitudinal planes.

Preferably, receiving and processing the signals to reconstruct the tomographic images comprises processing the signals to reconstruct a PET image. Preferably, receiving and processing the signals to reconstruct the tomographic images comprises processing the signals to reconstruct a SPECT image.

In a preferred embodiment of the invention receiving and processing the signals to reconstruct the tomographic images comprises processing the signals to reconstruct mutually-registered emission and transmission tomographic images.

There is further provided, in accordance with a preferred embodiment of the invention, a PET camera, comprising:

two emission detectors, positioned on opposing sides of the body of a subject, which receive radiation from the body and generate signals responsive thereto;

a radiation source, which directs radiation toward the body, and a transmission detector, which receives radiation transmitted through the body from the radiation source and generates signals responsive thereto.

Preferably, the camera comprises a computer, which receives the emission- and transmission-responsive signals and reconstructs PET and transmission tomographic images of the body.

Preferably, the radiation source is collimated so as to substantially limit irradiation of the body to rays that would be incident on the transmission detector in the absence of the body.

Preferably, the transmission detector comprises a linear transmission detector, preferably comprising a solid state detector array.

In a preferred embodiment of the invention the linear transmission detector is generally perpendicular to a plane defined by the planar emission detectors.

Preferably, the radiation source is collimated so as to substantially preclude direct incidence of radiation from the source on the emission detectors.

Preferably the radiation source and transmission detector are mounted in a common plane and jointly translate in a direction generally perpendicular to the plane. Preferably, the common plane comprises an axial plane through the body.

Preferably, the radiation source is collimated so that radiation therefrom is directly incident on the body substantially only in a vicinity of the common plane.

Preferably, the radiation source is mounted adjacent to a first one of the two emission detectors, and wherein the transmission detector comprises a region of the second of the emission detectors, generally opposite the radiation source.

Preferably, the region of the second emission detector has an elongate, generally linear form. Preferably, the elongate, generally linear form is oriented in a generally longitudinal direction relative to the body. Preferably, the radiation source comprises a line source oriented in the generally longitudinal direction.

In a preferred embodiment of the invention the radiation source comprises a line source, oriented in a generally transverse direction relative to the body.

In a preferred embodiment of the invention, the radiation source comprises a point source of radiation.

Preferably, the emission detectors are parallel planar emission detectors.

The present invention will be more fully understood from the following detailed description of the preferred embodiments thereof, taken together with the drawings in which:

DETAILED DESCRIPTION OF PREFERRED EMBODIMENTS

Figure 4:
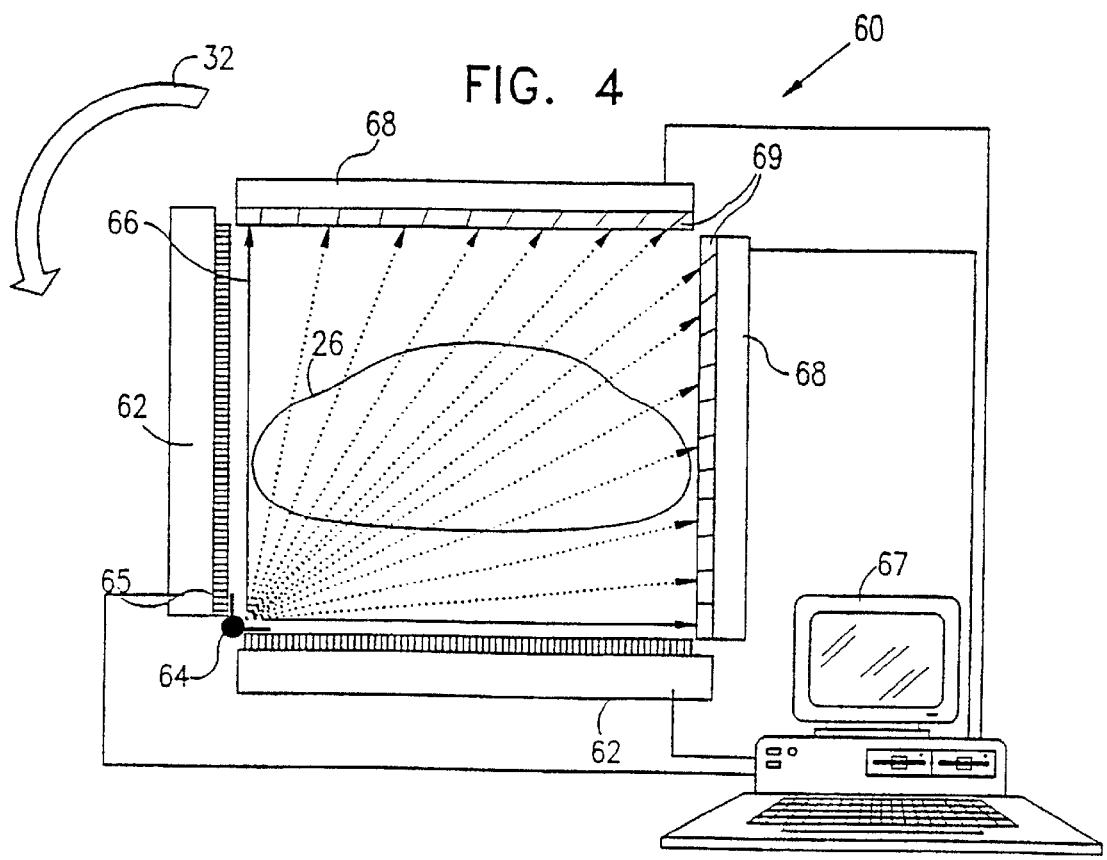
FIG. 4 is a schematic, sectional representation of a gamma camera, particularly useful in SPECT imaging, in accordance with a preferred embodiment of the present invention.

Reference is now made to FIG. 4, which is a schematic, sectional representation of a SPECT camera 60, for producing simultaneous computerized tomographic emission and transmission images of the body 26 of a subject, in accordance with a preferred embodiment of the present invention. Camera 60 comprises two planar emission detectors 62, arranged at right angles adjacent to body 26, each planar detector having an axis parallel to the long axis of body 26, perpendicular to the plane of the figure. Preferably, as is known in the art, each emission detector 62 comprises a sheet of scintillator material, such as NaCl(Tl), which emits visible and UV light in response to gamma radiation incident thereon, and an array of photomultiplier tubes, positioned behind the scintillator, so as to detect the light emitted by the scintillator.

Camera 60 further comprises two linear transmission detectors 68, mounted at right angles within the plane of the figure, opposite the emission detectors, so that the emission and transmission detectors together form a generally square profile in the plane of the figure. Detectors 68 are mounted so as to be jointly translatable in the axial direction, perpendicular to the plane of the figure, as will be described below. Each transmission detector 68 preferably comprises a linear array of solid state gamma radiation detectors, such as of CdTe or Cd(Zn)Te or other materials as known in the art. These solid state detectors typically have resolution limited by the element size, for example, 2 mm, as compared with 3–4 mm for the planar, scintillator-based transmission detectors that are commonly used in SPECT cameras known in the art.

A radiation point source 64, of any suitable type known in the art, such as a gamma ray or X-Ray source is mounted at or adjacent to the apex of the right angle formed between the two emission detectors 62, as shown. Source 64 emits a fan beam of radiation 66, preferably axially collimated by a source collimator 65 so as to be substantially confined to a narrow, planar axial slice through body 26, generally defined by the axial extent of source 64 and of the detection areas of transmission detectors 68. By collimating beam 66, unnecessary radiation dosage of subject 26 is reduced. Further preferably, collimator 65 also limits the transverse spread of beam 66 within the plane of the slice, so that beam 66 does not strike emission detectors 62.

Radiation in fan beam 66 passes through body 26 and is received by transmission detectors 68, which generate signals responsive to the partial transmission (and hence the attenuation) of beam 66 along a plurality of rays within the slice from source 64 to the detectors. Preferably, detector collimators 69, adjacent to the detectors 68, substantially limit the radiation that reaches the detectors to rays emitted by source 64 within the axial slice defined by the source and the detectors.

The four detectors 62 and 68 and source 64 are mounted, along with collimators 6; and 69, so as to be jointly rotatable about body 26, as indicated by arrow 32. Preferably, these elements revolve in step-wise fashion, most preferably by steps of about 2° and more generally within a range of 1–6°, although larger or smaller steps may be used. At each step, emission detectors 62 are held stationary while source 64 and transmission detectors 68 are translated axially over the a portion of the length of body 26 for which an image is desired. Meanwhile, emission detectors 62 receive radiation emitted from body 26. Source 64 and detectors 68 are maintained substantially in a common axial plane, so that they translate together along body 26, and detectors 68 generate signals responsive to the attenuation of the radiation in axial slices through the body over the entire axial range.

The signals from emission detectors 62 and transmission detectors 68 are received by a computer 67, which processes the signals to reconstruct mutually-registered emission and transmission tomographic images. In order to reconstruct the emission image, it is sufficient that emission detectors 62 receive radiation while over 90° of revolution about the axis of subject 26. A fill tomographic transmission image, as is known in the art, however, requires that source 64 and emission detectors 68 revolve by at least 180°. Therefore, in one preferred embodiment of the present invention, the elements of camera 60 revolve 180° around subject 26, and computer 67 receives signals from detectors 62 and 68 over the entire 180° revolution in order to reconstruct the images.

In another preferred embodiment of this type, however, the elements of camera 60 revolve by only 90° around subject 26, in order to reduce scanning time and simplify mechanical elements of the camera Partial view reconstruction algorithms, as known in the art are used to reconstruct the image.

In still another preferred embodiment of the present invention, which may also be described with reference to FIG. 4, radiation source 64 comprises a line source, rather than a point source, and transmission detectors 68 comprise planar detectors, like emission detectors 62. Collimator 65 collimates radiation beam 66 axially, as well as transversely, so that substantially all rays in the beam are contained within axial slices, i.e., they propagate in directions substantially parallel to the plane of the figure. In this configuration, transmission detectors 68 receive transmitted radiation and generate signals responsive thereto with respect to the entire axial extent of the portion of body 26 that is being imaged, without the need for axial translation of the detectors and source 64 as in the embodiments described above.

Other variations on the device show in FIG. 4 include utilizing a short line source and correspondingly short axial planar detector which translate, together in the axial direction. Alternatively, a point source, together with an axially short planar detector, which translate axially, are used. In this case the sensitivity is increased at the expense of a more complicated reconstruction.

In an alternative preferred embodiment of the invention, line detectors 68 are replaced by a circular arc shaped line of detectors preferably having source 64 as its center.

Figure 5:
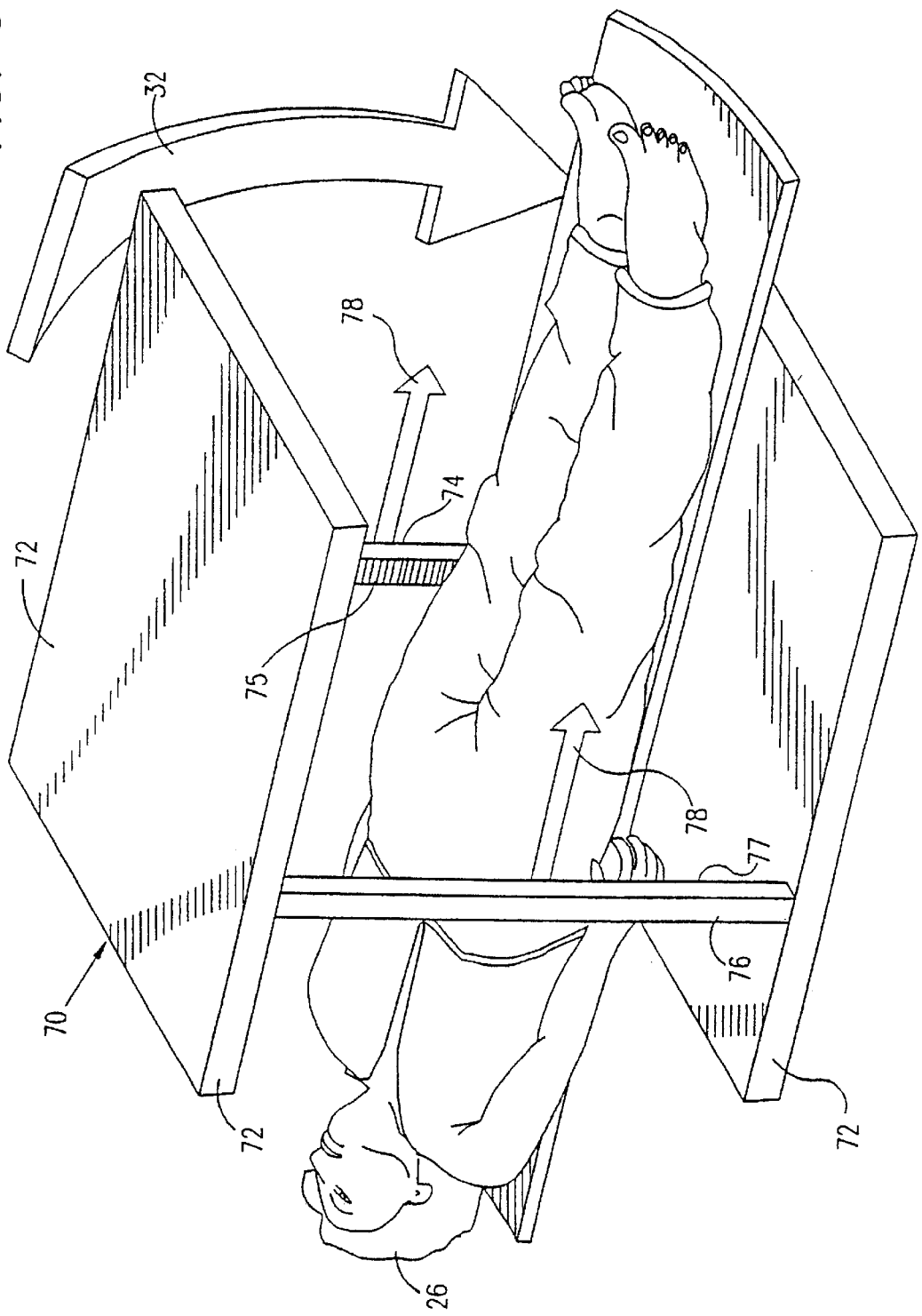
FIG. 5 is a schematic, isometric representation of a gamma camera, useful in both PET and SPECT imaging, in accordance with another preferred embodiment of the present invention.

FIG. 5 is a schematic, isometric representation of another gamma camera 70, particularly useful in both SPECT ad PET imaging, in accordance with another preferred embodiment of the present invention, in which planar emission detectors 72 are mutually parallel, in opposing positions on either side of body 26. A linear radiation source 74 is mounted perpendicular to emission detectors 72 on one side of body 26, and a linear detector 76 is similarly mounted on the other side, so that the source and detector may be translated together axially along body 26, as indicated by arrows 78. The signals generated by detectors 72 and 76 are received by a computer (not shown in this figure) and used to reconstruct emission and transmission tomographic images, as described above.

Source 74 and detectors 72 and 76 revolve together about the axis of body 26 as indicated by arrow 32, in similar fashion to the revolution of the elements of camera 60, shown in FIG. 4. In camera 70, however, 180° of revolution are required for both the emission and transmission images. On the other hand, because of the opposing positions of detectors 72, camera 70 is also suited for PET imaging of body 26, which depends on simultaneously detecting two radiation photons emitted in opposite directions from a point in the body.

Preferably, source 74 is axially and transversely collimated, by means of a source collimator 75 adjacent thereto, so that radiation is emitted toward body 26 substantially only along rays that are parallel to the planes of detectors 72 and contained within an axial slice through body 26 containing detector 76. Additionally or alternatively, detector 76 may also include a detector collimator 77, so that only such parallel rays may impinge on radiation-responsive portions of the detector. In other words, radiation transmitted from source 74 and received by detector 76 is generally confined to parallel lines, passing horizontally through body 26 in the view of FIG. 5. (Of course, as the elements of camera 70 revolve around body 26, the lines of radiation will not remain horizontal, but will describe different radial angles within the slice.) In this way, the tomographic transmission image that is reconstructed from the data will have the best possible resolution for this imaging geometry, with minimal unnecessary radiation dosage to the subject. Further preferably, the contribution of crosstalk due to photons emitted from body 26 striking transmission detector 76 may be estimated and subtracted out of the transmission data before the transmission image is reconstructed.

Similarly, the amount of stray radiation from source 74 that is allowed to reach emission detectors 72 is also minimized, thereby reducing any resultant crosstalk in the emission signals and thus improving the quality of the tomographic emission image. The effect of crosstalk on the emission image is preferably further reduced by choosing and/or configuring radiation source 74 so that it emits radiation of substantially different photon energy from that emitted by the radioisotope marker introduced into body 26.

In an alternative preferred embodiment of the invention, the source and detector 74 and 72 are oriented perpendicular to the positions shown in FIG. 5. They thus form the sides of a plane parallel to detectors 72. In operation source and detector 74 and 72 move laterally from one emission detector to the other, collecting transmission data for the generation of a transmission tomographic image. As indicated above, the transmission source and detectors are suitably collimated to avoid excess radiation exposure to the patient and to reduce capture of emission radiation by the detectors. Furthermore, as indicated above, the energy of he transmission radiation is different from that of the emission radiation.

Although cameras 60 and 70 described above each have two emission detectors and one or two transmission detectors, respectively, it will be appreciated that the principles of the present invention may similarly be applied to produce gamma cameras having greater or lesser numbers of detectors and different detector geometries. For example, such a camera may be produced having a single emission detector and a single, linear transmission detector, preferably mutually positioned at generally right angles. This camera would achieve at least the object of producing tomographic images of improved quality, although clearly it would not be suited for PET imaging.

Figure 1:
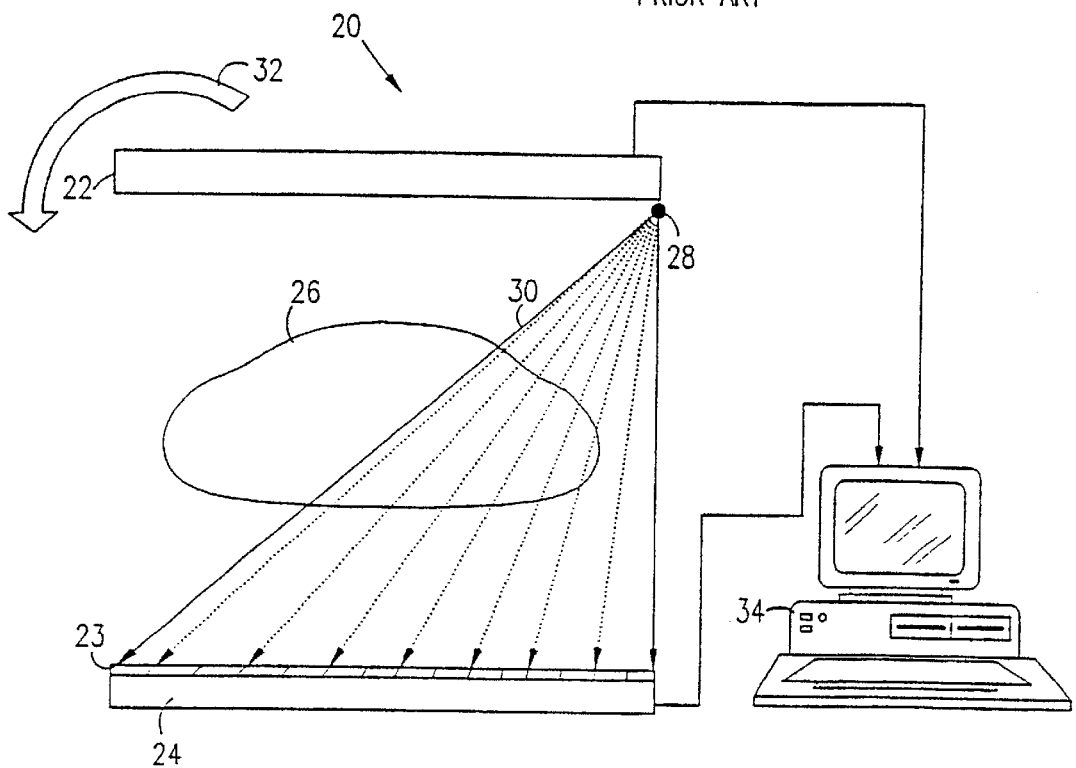
FIG. 1 is a schematic, sectional representation of a gamma camera known in the art.
Figure 2:
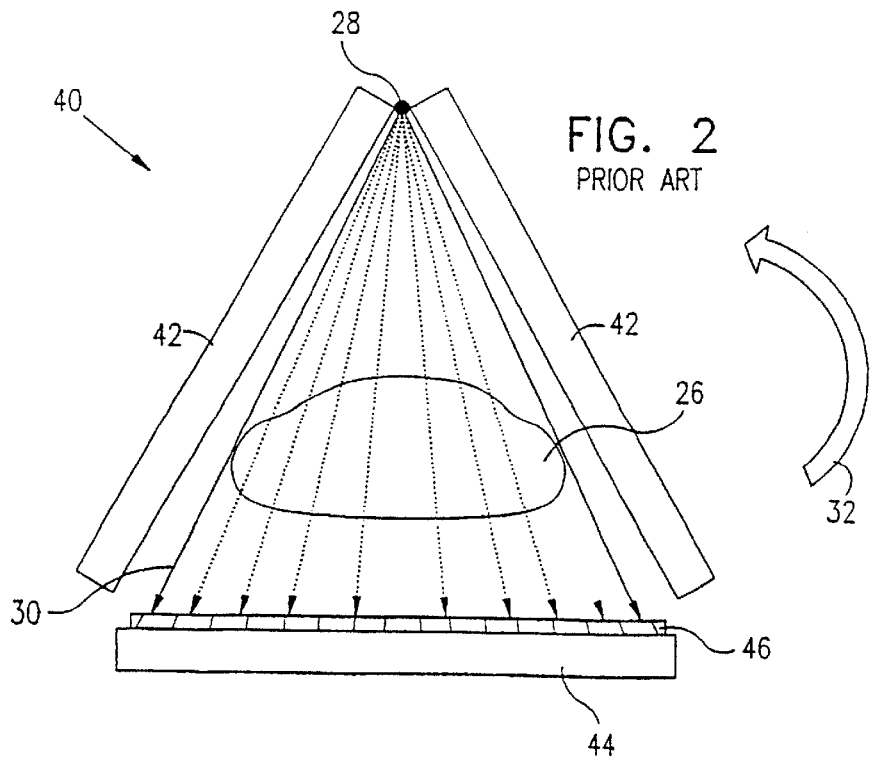
FIG. 2 is a schematic, sectional representation of another gamma camera known in the art.
Figure 3A:
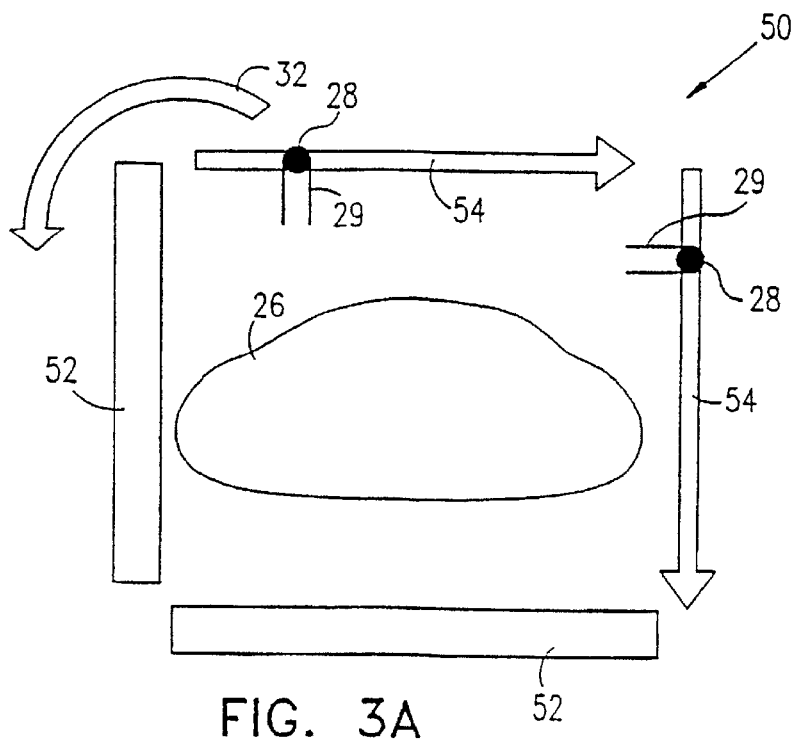
FIGS. 3A and 3B are schematic, sectional representations of other gamma cameras known in the art.
Figure 3B:
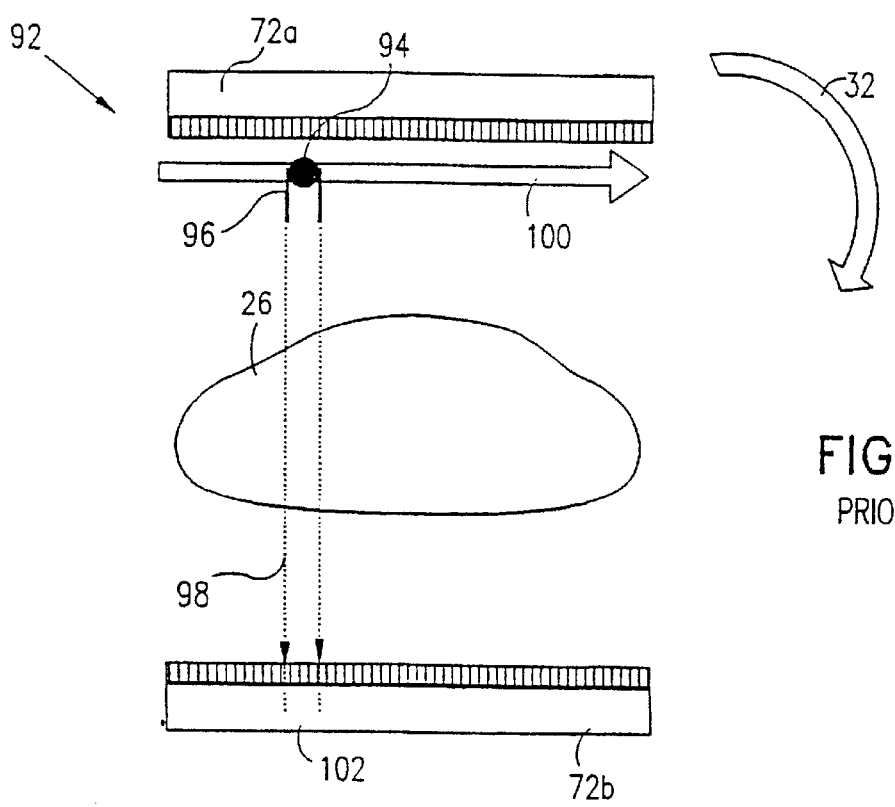

Similarly, although in general the detectors are preferably mutually positioned at right angles, some aspects of the principles of the present invention may be applied to cameras having other detector arrangements. For example, a SPECT camera in accordance with the principles of the present invention may be produced in the triangular arrangement of camera 40, shown in FIG. 2, by replacing planar detector 44 with a suitable linear detector, and replacing line source 28 with a suitable point source, wherein the linear detector and the point source translate together in the axial direction, perpendicular to the plane of the figure, as in camera 60.

Figure 6A:
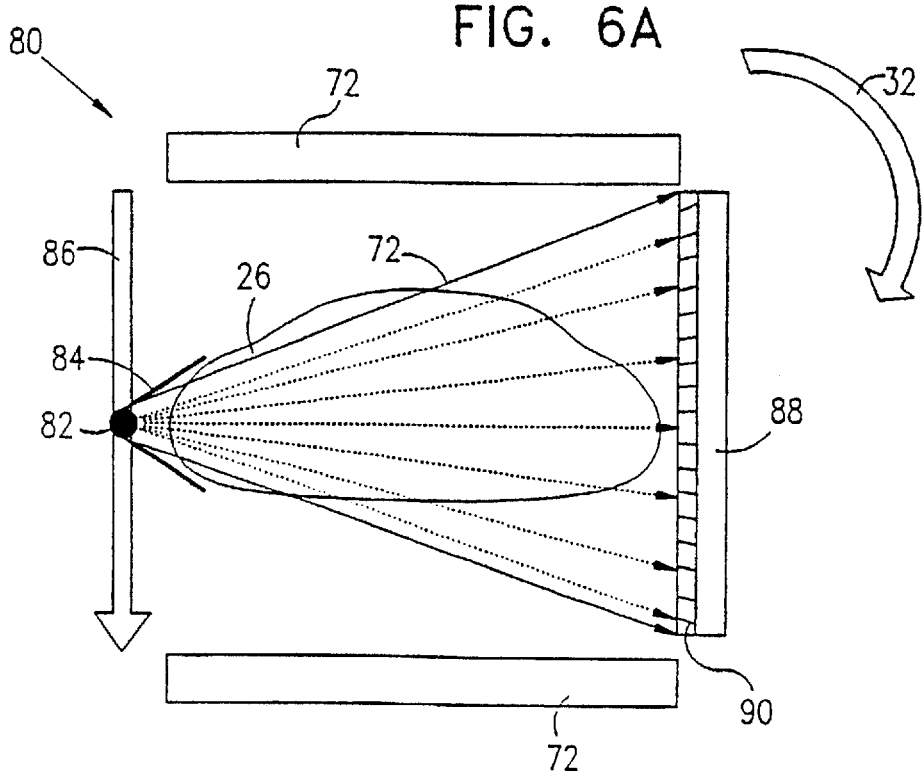
FIGS. 6A and 6B are schematic, sectional representations of two gamma cameras, in accordance with still other preferred embodiments of the present invention.

FIG. 6A schematically illustrates, in sectional view, a gamma camera 80 also suitable particularly for PET imaging, in accordance with still another preferred embodiment of the present invention. Like camera 70, shown in FIG. 5, camera 80 comprises two substantially parallel, planar emission detectors 72 and an axially-translatable linear transmission detector 88, perpendicular to the emission detectors, preferably with a detector collimator 90. A radiation point source 82 irradiates body 26 with a fan beam 85 of radiation, wherein preferably a suitable source collimator 84 keeps beam 85 contained within an axial slice containing detector 88. Radiation source may be a gamma ray source or, in some preferred embodiments of the invention it may be an X-Ray source, such as an X-Ray tube.

Source 82 may optionally be translatable in a direction parallel to the long dimension of detector 88, as indicated by arrow 86, although in this case, collimator 84 should be adjusted, as the source moves, to prevent beam 85 from impinging on emission detectors 72 and collimator 90 should preferably be omitted. Furthermore, when fan beam 82 is made to move, the velocity is preferably varied so that the total (unattenuated) irradiation of detector 88 is optimized.

Operation of camera 80 is substantially similar to the operation of camera 70, as described with reference to FIG. 5. As in camera 70, at each of a plurality of angular positions in the course of a revolution, indicated by arrow 32, source 82 and transmission detector 88 are scanned axially along body 26. In camera 80, however, source 82 may also be scanned in the direction of arrow 86 during or in alternation with the axial scan, so that transmission data relative to additional angular "views" through body 26 may be acquired.

Figure 6B:
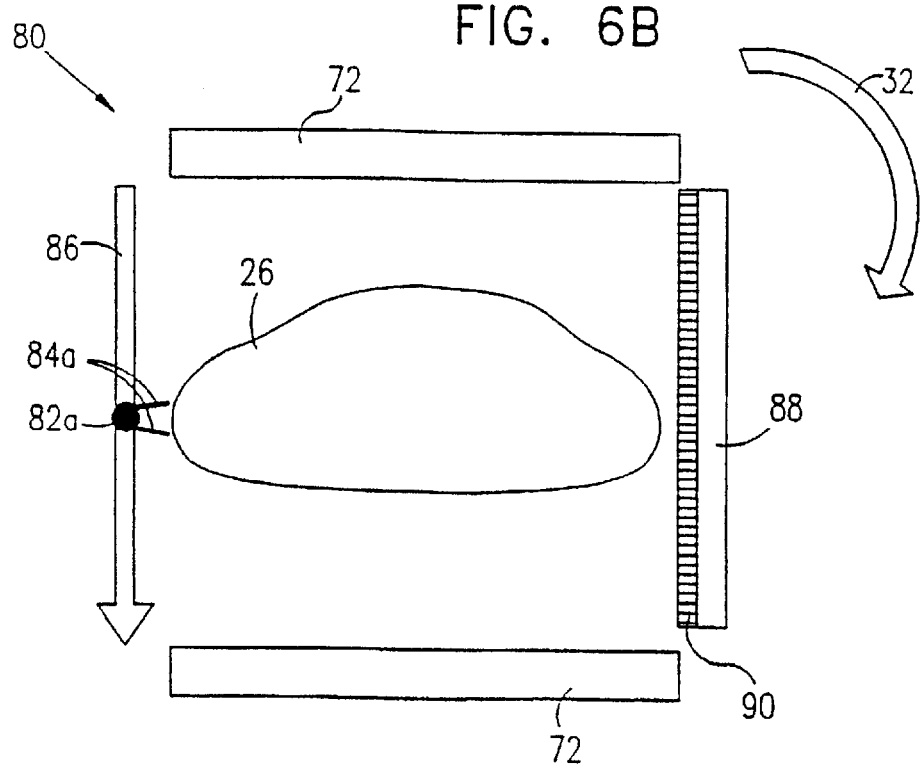

Alternatively, as shown in FIG. 6B, source 82 is replaced by a moving collimated point source 82a which scans detector 88 as shown by arrow 86 at each angular position of the camera and at each axial position of detector 88.

Figure 7:
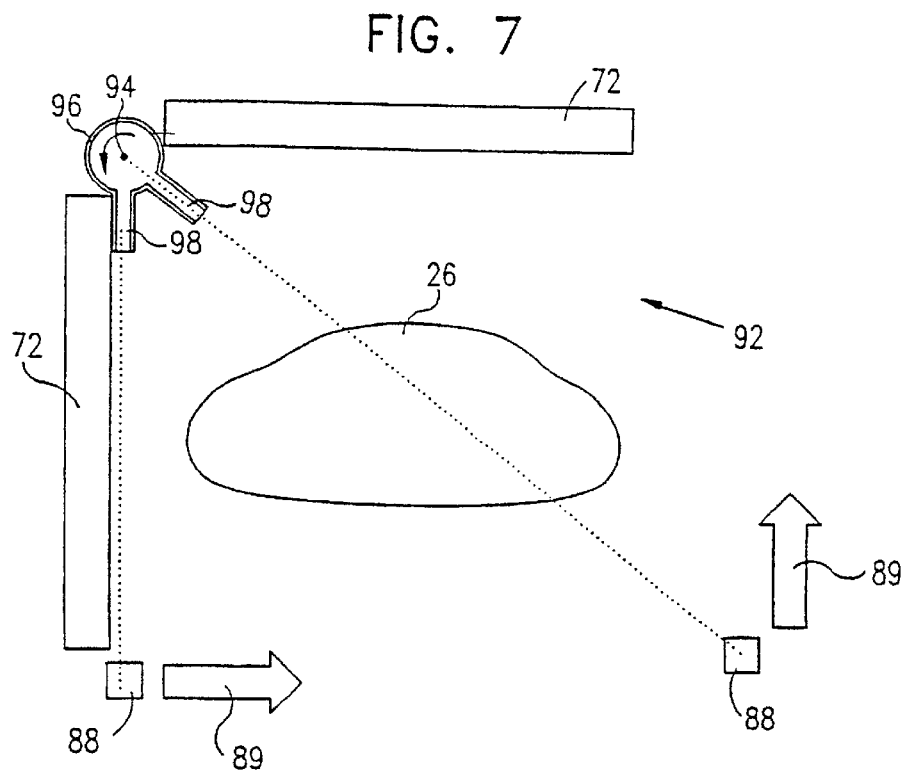
FIG. 7 is a schematic sectional representation of yet another gamma camera in accordance with a preferred embodiment of the invention.

FIG. 7 shows a gamma camera 92 in accordance with yet another preferred embodiment of the invention. In this camera emission detectors 72 form an "L." Two translatable linear transmission detectors 88, which are shown end-on, translate along the sides of a rectangle opposite detectors 72 as shown by arrows 89. A linear source 94, also shown end-on, is mounted in a rotatable housing 96, fitted with two collimators 98. As linear detectors 88 move in direction 89, housing 96 rotates such that collimators 98 are aligned with detectors 88 allowing their illumination by source 94. In addition to the collimation provided by collimators 98, the radiation of source 94 is also collimated with septa placed parallel to the plane of the figure.

While two emission and two transmission detectors are preferred for the embodiment of FIG. 7, only a single detector of each type need be used, with a single collimator 98 to direct radiation from source 94 to the transmission detector. However, in this embodiment at least 180 degrees of rotation will be necessary to produce an emission tomographic image and, generally, 360 degrees of rotation will be required to produce a transmission tomographic image. If two transmission detectors, as shown in FIG. 7, are utilized, only 180 degree rotation is required to produce both emission and transmission tomographic images.

In a further alternative variation of the embodiment of FIG. 7, one or two emission detectors, a single linear transmission detector 88 and a single scanning collimator 94 are used. For this variation detector 88 moves in an arc such that its distance from source 94 is substantially constant. This allows for a significant reduction in the complexity of the tomographic reconstruction of the emission image.

Further variations in the construction of the gamma cameras are possible. For example, the single line detector and single line source of the devices of FIGS. 5, and 6B can be augmented by utilizing a plurality of sets of detector and sources. This improves the sensitivity of the cameras. The line sources (and associated linear detectors) may be placed side by side or may be widely spaced from each other. The same effect can be achieved by simply using a source (line or point as applicable) which is relatively wide (for example, by use of wide or coarse collimation) in the direction of motion of the source or by widening the slots 98 for the embodiments of FIG. 7, and adding additional rows of detectors. The use of this solution is limited by the increasing number of oblique rays as the source is widened.

It will be appreciated that the preferred embodiments described above are cited by way of example, and the full scope of the invention is limited only by the claims.

What is claimed is:

1. A gamma camera, comprising:
   at least one emission detector, which receives radiation emitted from the body of a subject and generates signals responsive thereto;
   a radiation source, which directs radiation toward the body;
   at least one transmission detector, having a long dimension, which receives radiation transmitted through the body from the radiation source and generates signals responsive thereto,
      wherein the transmission detector translates in a direction generally perpendicular to the long dimension relative to the emission detector.

2. A camera according to claim 1 wherein the at least one emission detector, the radiation source and the at least one transmission detector jointly revolve about an axis generally parallel to the body.

3. A camera according to claim 1, wherein the radiation source is collimated so as to substantially preclude direct incidence of radiation from the source on the at least one emission detector.

4. A camera according to claim 1, wherein the radiation source is collimated so as to substantially limit irradiation of the body to rays that would be incident on the transmission detector in the absence of the body.

5. A camera according to claim 1 wherein the transmission detector comprises an array of detectors.

6. A camera according to claim 5 wherein the array of detectors comprises a linear array.

7. A camera according to claim 6, wherein the array comprises a plurality of linear arrays.

8. A camera according to claim 5 wherein the detectors are solid state detectors.

9. A camera according to claim 1 wherein the source and transmission detector are mounted in a common plane.

10. A camera according to claim 9, wherein the radiation source is collimated so that radiation therefrom is directly incident on the body substantially only in a vicinity of the common plane.

11. A camera according to claim 1 wherein the source and transmission detector jointly translate in a direction perpendicular to the common plane.

12. A camera according to claim 1, wherein the radiation source and transmission detector are mounted in an common axial plane and translate in a direction parallel to an axis of the body.

13. A camera according to claim 12, wherein the common plane is generally perpendicular to a plane defined by the at least one emission detector.

14. A camera according to claim 9, wherein the common plane is generally parallel to a plane defined by the at least one emission detector.

15. A camera according to claim 14, wherein the radiation source and transmission detector are mounted in a common transverse plane and translate in a direction perpendicular to an axis of the body.

16. A camera according to claim 1, wherein the radiation source comprises a point source.

17. A camera according to claim 16, wherein the at least one emission detector comprises two mutually-angled planar detectors, both detectors being substantially parallel to the axis of the body and defining an angle in which the body is contained, and wherein the point source is mounted to translate parallel to the axis in a vicinity of the apex of the angle.

18. A camera according to claim 17, wherein the two planar detectors are mutually substantially perpendicular.

19. A camera according to claim 17, wherein the at least one transmission detector comprises two mutually substantially perpendicular detectors, each of which is also perpendicular to one of the two planar detectors to which it is adjacent.

20. A camera according to claim 17 wherein the at least one transmission detector comprises an array of detectors placed along an arc having the source as its center.

21. A camera according to claim 17, wherein the at least one transmission detector comprises two mutually-angled detectors.

22. A camera according to claim 1, wherein the at least one planar emission detector comprises two substantially parallel planar detectors, positioned on opposing sides of the body.

23. A camera according to claim 1 wherein the source is a line source.

24. A camera according to claim 1 wherein the source is a line source and wherein the transmission detector moves along the circumference of a circle having the source as its center.

25. A camera according to claim 22, wherein the camera produces PET images.

26. A camera according to claim 1, wherein the camera produces SPECT images.

27. A camera according to claim 1 and comprising a computer which receives the emission- and transmission responsive signals and reconstructs emission and transmission tomographic images of the body responsive to the signals.

28. A PET camera, comprising:
- two emission detectors, positioned on opposing sides of the body of a subject, which receive radiation from the body and generate signals responsive thereto;
- a radiation source, which directs radiation toward the body; and
- a separate transmission detector, which receives radiation transmitted through the body from the radiation source and generates signals responsive thereto.

29. A camera according to claim 28, and comprising a computer, which receives the emission- and transmission-responsive signals and reconstructs PET and transmission tomographic images of the body.

30. A camera according to claim 28, wherein the radiation source is collimated so as to substantially limit irradiation of the body to rays that would be incident on the transmission detector in the absence of the body.

31. A camera according to claim 28, wherein the transmission detector comprises a linear transmission detector.

32. A camera according to claim 31, wherein the linear transmission detector comprises a solid state detector array.

33. A camera according to claim 31, wherein the linear transmission detector is generally perpendicular to a plane defined by the planar emission detectors.

34. A camera according to claim 31, wherein the radiation source and transmission detector are mounted in a common plane and jointly translate in a direction generally perpendicular to the plane.

35. A camera according to claim 34, wherein the common plane comprises an axial plane through the body.

36. A camera according to claim 34, wherein the radiation source is collimated so that radiation therefrom is directly incident on the body substantially only in a vicinity of the common plane.

37. A camera according to claim 28, wherein the radiation source comprises a line source, oriented in a generally transverse direction relative to the body axis.

38. A camera according to claim 28 wherein the emission detectors are planar, parallel detectors.

* * * * *